(12) United States Patent
Matsumoto et al.

(10) Patent No.: US 8,446,485 B2
(45) Date of Patent: May 21, 2013

(54) IMAGE PROCESSING APPARATUS, IMAGE PROCESSING METHOD, AND STORAGE MEDIUM THEREOF

(75) Inventors: Kosuke Matsumoto, Tokyo (JP); Erina Ichikawa, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 166 days.

(21) Appl. No.: 12/840,363

(22) Filed: Jul. 21, 2010

(65) Prior Publication Data
US 2011/0019029 A1 Jan. 27, 2011

(30) Foreign Application Priority Data

Jul. 23, 2009 (JP) .................................. 2009-172198
May 26, 2010 (JP) .................................. 2010-120194

(51) Int. Cl.
*H04N 5/228* (2006.01)
*G06K 9/00* (2006.01)

(52) U.S. Cl.
USPC ....................................... 348/222.1; 382/167

(58) Field of Classification Search
USPC .................. 348/207.99, 222.1, 225.1, 229.1, 348/223.1, 255, 221.1; 382/167
See application file for complete search history.

(56) References Cited

U.S. PATENT DOCUMENTS

| 7,539,342 | B2 | 5/2009 | Tabata et al. | |
|---|---|---|---|---|
| 7,912,282 | B2 * | 3/2011 | Nakamura | 382/167 |
| 7,948,524 | B2 * | 5/2011 | Endo et al. | 348/222.1 |
| 8,179,367 | B2 * | 5/2012 | Kitaura | 345/156 |
| 2005/0265626 | A1 * | 12/2005 | Endo et al. | 382/274 |
| 2008/0062125 | A1 * | 3/2008 | Kitaura | 345/157 |

FOREIGN PATENT DOCUMENTS

| JP | 2005-327009 A | 11/2005 |
|---|---|---|
| JP | 2006-121416 A | 5/2006 |
| JP | 2007-004455 A | 1/2007 |
| JP | 2007-087123 A | 4/2007 |
| JP | 2007-190885 A | 8/2007 |
| JP | 2008-244997 A | 10/2008 |

OTHER PUBLICATIONS

Japanese Office Action dated Jul. 5, 2011 (and English translation thereof) in counterpart Japanese Application No. 2010-120194.
Korean Office Action dated Oct. 12, 2011 (and English translation thereof) in counterpart Korean Application No. 10-2010-0071331.
Japanese Office Action dated Jan. 10, 2012 (and English translation thereof) in counterpart Japanese Application No. 2010-120194.
Korean Office Action dated Jul. 4, 2012 (and English translation thereof) in counterpart Korean Application No. 10-2010-0071331.

* cited by examiner

*Primary Examiner* — Chieh M Fan
*Assistant Examiner* — Ahmed A Berhan
(74) *Attorney, Agent, or Firm* — Holtz, Holtz, Goodman & Chick, P.C.

(57) ABSTRACT

An image processing apparatus, including: an image obtaining means that obtains an image; a color area detecting means that detects a predetermined color area from the image thus obtained by the image obtaining means; an area specifying means that specifies an area to be adjusted based on saturation and brightness of the color area thus detected by the color area detecting means; and a color adjusting means that adjusts at least one of a hue, the saturation and the brightness of a pixel in the process area thus specified by the area specifying means.

8 Claims, 8 Drawing Sheets

FIG. 8A
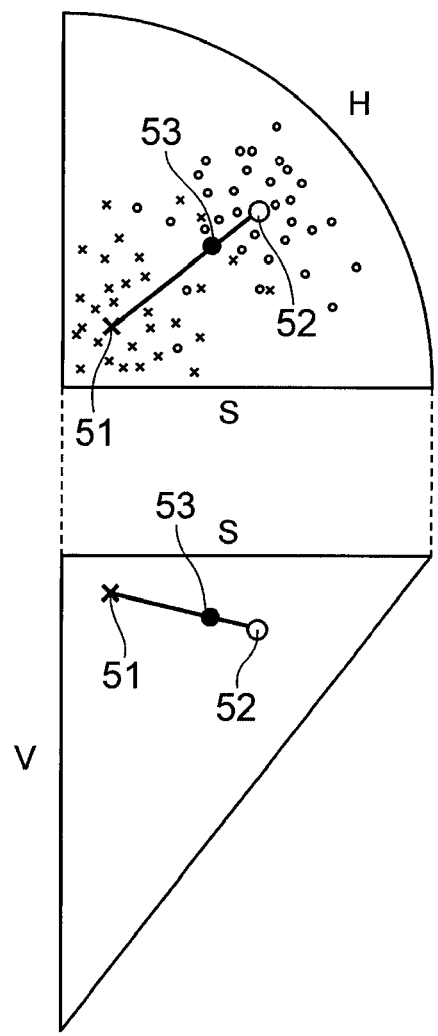
FIG. 8B
FIG. 9A
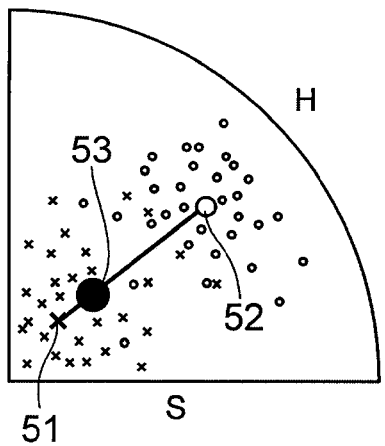
FIG. 9B
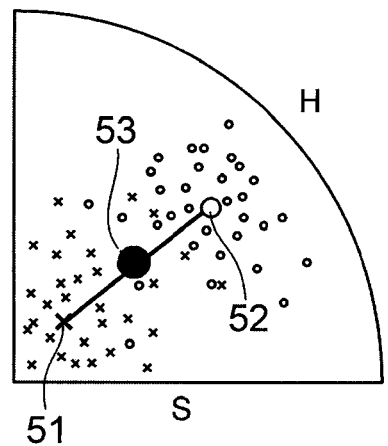

IMAGE PROCESSING APPARATUS, IMAGE PROCESSING METHOD, AND STORAGE MEDIUM THEREOF

This application is based on and claims the benefit of priority from Japanese Patent Application Nos. 2009-172198 and 2010-120194, respectively filed on 23 Jul. 2009 and 26 May 2010, the contents of which are incorporated herein by reference.

BACKGROUND OF THE INVENTION

1. Field of the Invention

The present invention relates to an image processing apparatus, an image processing method, and a storage medium thereof.

2. Related Art

For example, Japanese Patent Application No. 2006-121416 discloses a technique of carrying out a whitening process on a face area in a digital image obtained by capturing an image of a person in order to increase brightness of a portion to be highlighted.

An image processing method disclosed in Japanese Patent Application No. 2006-121416 carries out the whitening process by generating a bokeh image from an original image to be processed and increasing the brightness of a portion to be highlighted using this bokeh image.

It is often the case that, when capturing a picture of a person, illumination in the room and flash light emission at the time of photographing are overlapped with the person's face due to sebum on a skin of the face, and unnatural gloss is thus produced in the image that has been captured. Such unnatural gloss is called as "shine". According to the image processing method disclosed in Japanese Patent Application No. 2006-121416, when a shine component is included in a facial image to be processed, an area of the shine component is expanded by the whitening process, and therefore it is not possible to reduce the shine.

SUMMARY OF THE INVENTION

It is an object of the present invention to provide an image processing apparatus, an image processing method, and a storage medium having stored therein an image processing program, capable of reducing a shine component in a face included in an image that has been captured, thereby converting the captured image to a more favorable image.

In order to attain the aforementioned object, in accordance with an aspect of the present invention, there is provided an image processing apparatus, comprising: an image obtaining means that obtains an image; a color area detecting means that detects a predetermined color area from the image thus obtained by the image obtaining means; an area specifying means that specifies an area to be adjusted based on saturation and brightness of the color area thus detected by the color area detecting means; and a color adjusting means that adjusts at least one of a hue, the saturation and the brightness of a pixel in the area to be adjusted thus specified by the area specifying means.

In order to attain the aforementioned object, in accordance with another aspect of the present invention, there is provided an image processing method comprising the steps of: an image obtaining step of obtaining an image; a color area detecting step of detecting a predetermined color area from the image thus obtained in the image obtaining step; an area specifying step of specifying an area to be adjusted based on saturation and brightness of the color area thus detected in the color area detecting step; and a color adjusting step of adjusting at least one of a hue, the saturation and the brightness of a pixel in the area to be adjusted thus specified in the area specifying step.

In order to attain the aforementioned object, in accordance with another aspect of the present invention, there is provided a storage medium having stored therein an image processing program which causes a computer provided with an image obtaining means that obtains an image to function as: a color area detecting means that detects a predetermined color area from the image thus obtained by the image obtaining means; an area specifying means that specifies an area to be adjusted based on saturation and brightness of the color area thus detected by the color area detecting means; and a color adjusting means that adjusts at least one of a hue, the saturation and the brightness of a pixel in the area to be adjusted thus specified by the area specifying means.

BRIEF DESCRIPTION OF THE DRAWINGS

FIG. 8 is a set of diagrams illustrating one example of a method of calculating a personal target value of the shine suppressing process according to the second embodiment shown in FIG. 7, respectively illustrating a partial top view and a partial sectional view of an HSV space in which pixels in a flesh color obtaining area are plotted;

FIG. 9 is a set of diagrams illustrating one example of the method of calculating a personal target value of the shine suppressing process according to the second embodiment shown in FIG. 7, respectively illustrating partial top views of the HSV space;

BRIEF DESCRIPTION OF THE DRAWING

Preferred embodiments of the present invention are described hereinafter.

[First Embodiment]

Figure 1:
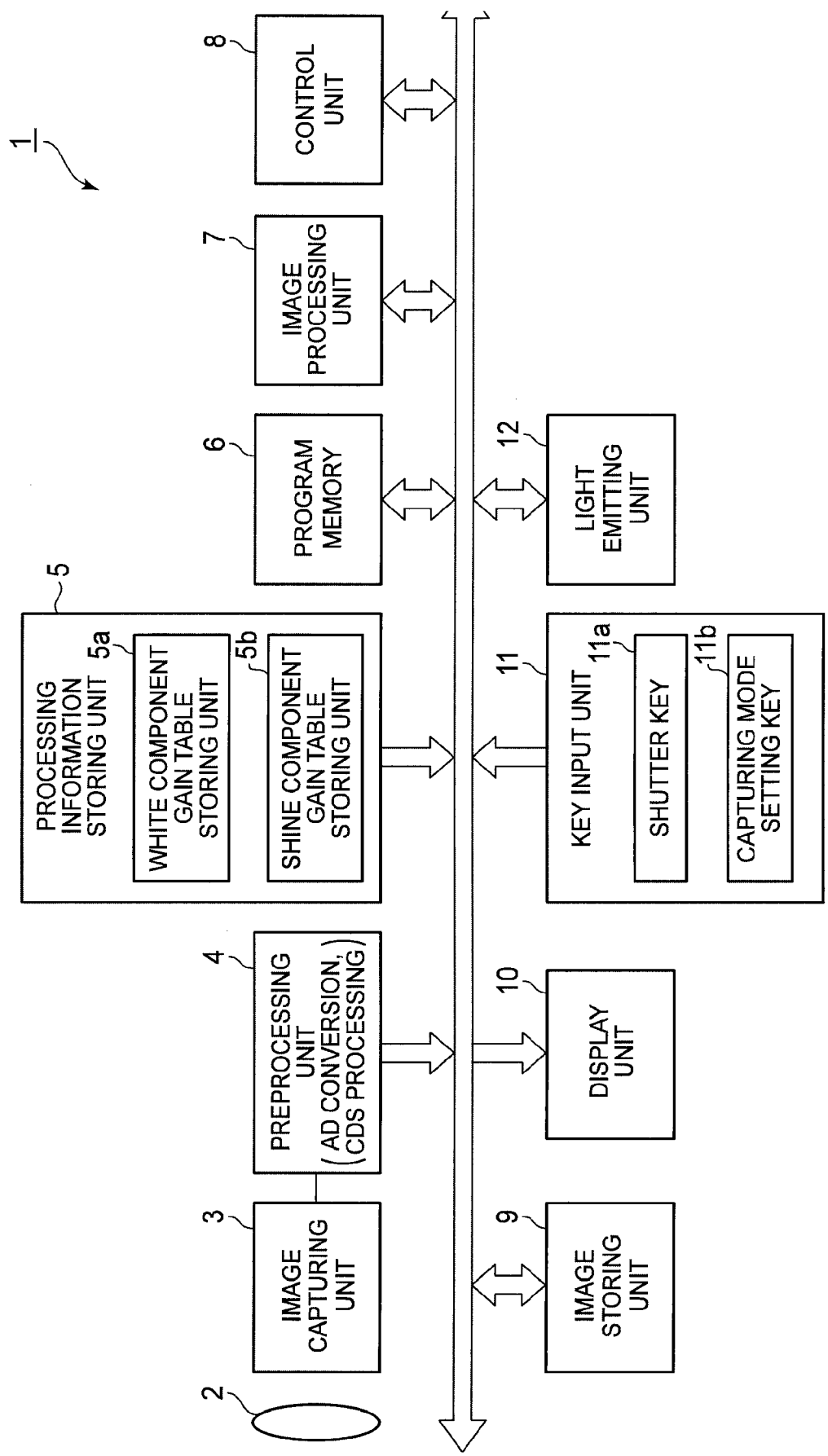
FIG. 1 is a block diagram of a circuit configuration of a digital camera that functions as an embodiment of an image processing apparatus according to the present invention.

FIG. 1 is a block diagram of a circuit configuration of a digital camera that functions as a first embodiment of an image processing apparatus according to the present invention.

The present embodiment of a digital camera 1 includes, as basic operating modes, a capturing mode for capturing still images or moving images and a playback mode for playing the captured images. The capturing mode includes a normal mode, a scene mode, and a movie mode. Among these, the scene mode includes, as sub-modes, such as a person capturing mode, a landscape capturing mode, and a nightscape capturing mode. The person capturing mode is a capturing mode suitable for capturing an image of a person.

As shown in FIG. 1, the digital camera 1 is provided with a photographing lens 2, an image capturing unit 3, a preprocessing unit 4, a processing information storing unit 5, program memory 6, an image processing unit 7, a control unit 8, an image storing unit 9, a display unit 10, a key input unit 11, and a light emitting unit 12.

The photographing lens 2 is an optical lens for producing an optical image on the image capturing unit 3 from incident light of a photographic subject, and is configured by a focus lens, a zoom lens, or the like.

The image capturing unit 3 is configured as an image sensor such as a CMOS (Complementary Metal Oxide Semiconductor) sensor, and is positioned on an optical axis of the photographing lens 2. The image capturing unit 3 receives image light that has been converged through the photographing lens 2, and photoelectrically converts an optical image of the photographic subject produced on a light receiving surface into analog image capturing signals. The photographing lens 2 and the image capturing unit 3 together serve as an image obtaining means in the present invention.

The preprocessing unit 4 controls CDS (correlated double sampling) with which analog image capturing signals corresponding to the optical image of the photographic subject outputted from the image capturing unit 3 are inputted and the inputted image capturing signals are retained, an analog/digital converter (ADC) for amplifying the image capturing signals and converting the amplified image capturing signals into digital image data, etc. The image capturing signals outputted from the image capturing unit 3 are forwarded through the preprocessing unit 4 to the image storing unit 9 in the form of digital image data. The process of the preprocessing unit 4 is executed in accordance with a command from the control unit 8.

The processing information storing unit 5 stores data as processing information that is used for adjusting the image data. In the first embodiment, the processing information storing unit 5 is at least provided with a white component gain table storing unit 5a and a shine component gain table storing unit 5b.

The white component gain table storing unit 5a stores a table of saturation gain values used for determining a degree of whiteness for respective pixels specified as a flesh color area that will be described later. Similarly, the shine component gain table storing unit 5b stores tables of saturation gain values and brightness gain values used for determining a degree of shininess for the respective pixels specified as the flesh color area.

The program memory 6 stores programs respectively corresponding to various processes that are executed by the image processing unit 7, the control unit 8, or the like.

The image processing unit 7 carries out various processes relating to image processing as will be described later. The image processing unit 7 serves as each of a color area detecting means, an area specifying means, a color adjusting means, a face detecting means, an area setting means, and intensity calculating means in the present invention.

Furthermore, the image processing unit 7 carries out a process of alternately converting an image that has been taken from RGB color space signals to HSV color space signals and vice versa. An RGB color space refers to a color space that is constituted by three components of red (R), green (G), and blue (B). Moreover, an HSV color space refers to a color space expressed by the HSV model and constituted by three components of hue (H), saturation (or chroma) (S), and brightness (or lightness value) (V). The HSV color space will be described later.

Referring back to FIG. 1, the control unit 8 is a central processing unit (CPU), for example, and controls the digital camera 1 as a whole according to the programs stored in the program memory 6. The control unit 8 also controls processing unit such as the preprocessing unit 4 and the image processing unit 7. The control unit 8 also specifies a capturing mode in accordance with an operation of a capturing mode setting key 11b, which will be described later, and sets image capturing conditions of the image capturing unit 3 in accordance with the capturing mode thus specified. The control unit 8 serves as a setting means and a photographing condition setting means.

The image storing unit 9 stores the image data that has been captured by the image capturing unit 3 and preprocessed by the preprocessing unit 4. When playing the image, the control unit 8 reads the image data from the image storing unit 9 and causes the display unit 10 to display the image data.

The display unit 10 is a color TFT (Thin Film Transistor) liquid crystal, an STN (Super Twisted Nematic) liquid crystal, or the like, for example, and displays a preview image, the image obtained after the photographing, a setting menu according to the control by the control unit 8, and the like.

The key input unit 11 inputs an instruction from a user. The key input unit 11 is provided with a shutter key 11a and a capturing mode setting key 11b. The shutter key 11a is an input unit for inputting an instruction from the user for starting to capture an image. The capturing mode setting key 11b is an input unit for inputting an instruction from the user of setting a desired operating mode.

The light emitting unit 12 is a light emitting device for irradiating flash lighting to the photographic subject. Since a shine component can be easily produced in an image of a person's face captured by irradiating flash lighting, a process of shine removal as described later is carried out on the image that is captured along with the flash lighting in the present embodiment.

Figure 2:
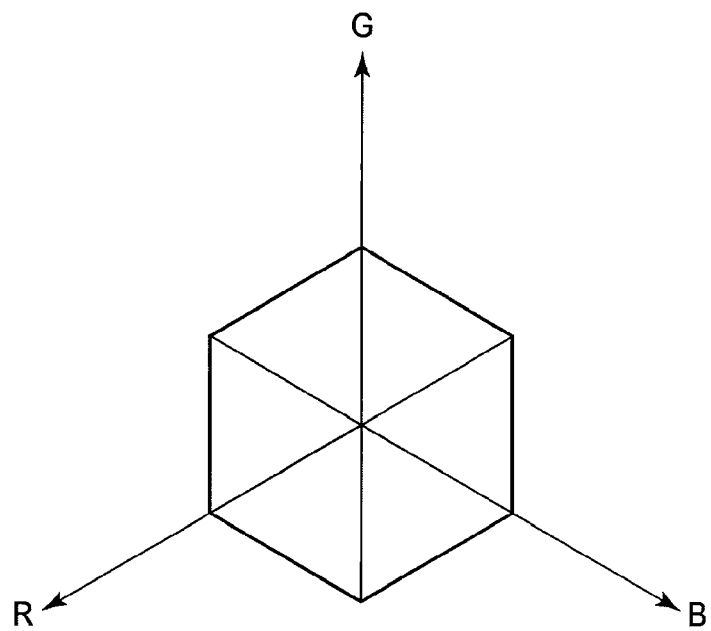
FIG. 2 is a schematic diagram for illustrating an RGB color space.

Next, the RGB color space and the HSV color space are described. FIG. 2 is a schematic diagram for illustrating the RGB color space, and FIG. 3 is a schematic diagram for illustrating the HSV color space.

As shown in FIG. 2, the image data processed by the preprocessing unit 4 is expressed by the color space that is constituted by three components of red (R), green (G), and blue (B). The image processing unit 7 according to the present embodiment is provided with a function of carrying out color space conversion of the image data from the RGB color space to the HSV color space.

Figure 3:
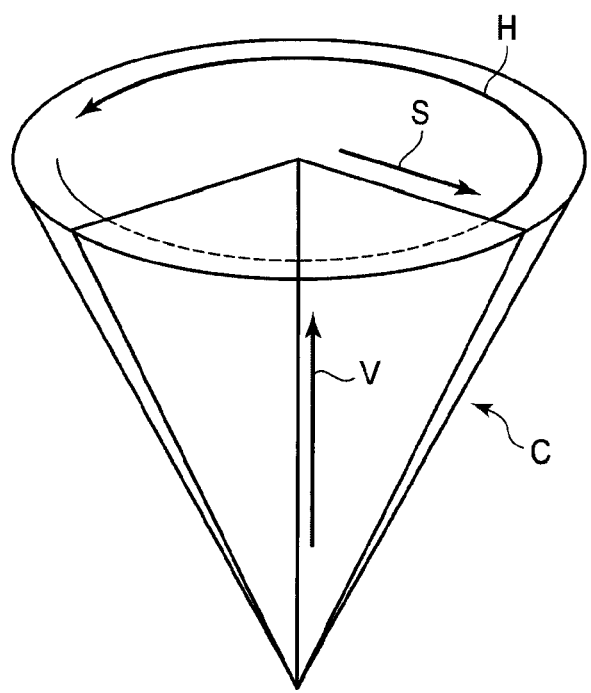
FIG. 3 is a schematic diagram for illustrating an HSV color space.

The HSV color space can be expressed by a circular cone C, as shown in FIG. 3. The HSV color space expressed by the circular cone C expresses the hue H along a circular area that is a base of the circular cone C. The hue H represents types of color such as red, blue, and yellow, and is expressed by an intensity distribution within a range of 0-359 degrees.

The saturation S is expressed by a distance from a center of the circular area as the base of the circular cone C in a radial direction (radius). The saturation S is vividness of the color, and is expressed by a value within a range of 0-255 with the center of the circular area as 0. In the HSV color space, grayness becomes more prominent and the saturation S is more expressed by a dull color as the value of the saturation S decreases.

The brightness V is expressed by a distance from a tip of the circular cone C in a direction toward the base. The brightness V is lightness of the color, and is expressed by a value within a range of 0-255, with the tip of the cone as 0. In the HSV color space, the brightness V is expressed by a darker color as the value of the brightness V decreases.

Now, a sequence of a process of reducing a shine component (hereinafter referred to as "shine suppressing process") in image data captured with the present embodiment of the digital camera 1 is described with reference to a flowchart shown in FIG. 4. The following process is carried out by the control unit 8 shown in FIG. 1 controlling each unit. Furthermore, the process of this flowchart starts when the user instructs to start to store a captured image by operating the shutter key 11a after operating the capturing mode setting key 11b to set any of the capturing modes.

First, in Step S1, the image processing unit 7 obtains image data processed by the preprocessing unit 4 from the image storing unit 9. Here, since it takes time to process if the pixel size is large, it is possible to create reduced scale image data by reducing the scale of the image data stored in the image storing unit 9, and to carry out the following process on this reduced scale image data.

In Step S2, the image processing unit 7 determines whether or not the obtained image data has been captured along with flash lighting of the light emitting unit 12. Here, the determination on whether or not the image has been captured along with the flash lighting can be made by the control unit 8 based on, for example, whether or not the light emitting unit 12 has irradiated flash lighting, or by referring to photographing information added to the image data. If the result of the determination in Step S2 is YES, the process proceeds to Step S3. In Step S3, the image processing unit 7 carries out a face detection process on the image data. Since the face detection process is a known technique, it will not be described in detail.

In Step S4, the image processing unit 7 determines whether or not a face area is detected in an image. If the result of the determination in Step S4 is YES, in Step S5, the image processing unit 7 carries out color space conversion of the image data of the face area from the RGB color space to the HSV color space. In Step S6, the image processing unit 7 obtains the hue H from the image in the HSV color space, and specifies a flesh color area having a color corresponding to the flesh color of the person.

Figure 5:
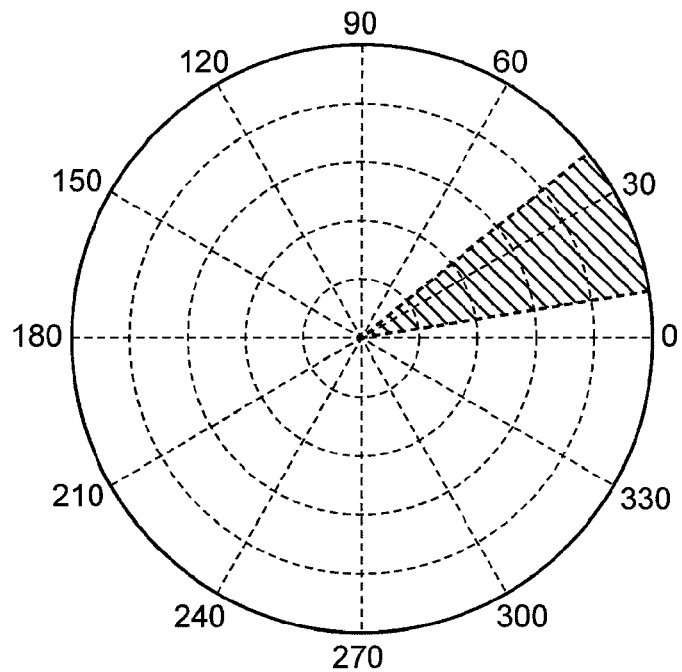
FIG. 5 is a schematic diagram illustrating a circular area along which values of the hue H in the HSV color space are distributed.

FIG. 5 is a schematic diagram illustrating the circular area along which values of the hue H in the HSV color space are distributed. The flesh color area having a color corresponding to the flesh color of the person is approximately constituted by a group of pixels having values of the hue H that are distributed within a range shown by oblique lines within the figure. The image processing unit 7 specifies the pixels within this range in the image in the HSV color space as the flesh color area.

In Step S7, the image processing unit 7 specifies an area of pixels where the saturation S is no greater than a predetermined value and the brightness V is no less than a predetermined value as an area to be adjusted (process area) out of the flesh color area. The process area is an area that is specified as a shine component within the flesh color area. Subsequently, in Step S8, the image processing unit 7 calculates the intensity of the shine component in the process area.

Here, a process for determining degrees of the whiteness and the shininess for each pixel in the process area is carried out. In the whiteness degree determination, the saturation gain value stored in the white component gain table storing unit 5a is compared with the saturation of a pixel, which is a subject of the determination. As the saturation of a white component is extremely low, it is possible to calculate a degree of the whiteness of a pixel by comparing the saturation of the pixel with the saturation gain value. Furthermore, in the shininess degree determination, the saturation gain value and the brightness gain value stored in the shine component gain table storing unit 5b are compared with the values of the saturation and the brightness of the pixel, which is the subject of the determination. Since the saturation of the shine component is low but the brightness is high, it is possible to calculate a degree of the shininess of a pixel by comparing the saturation gain value and the brightness gain value with the saturation and the brightness values of the pixel. The image processing unit 7 calculates the intensity of the shine component (shine intensity) for each the pixel, which is the subject of the determination based on the degrees of the whiteness and the shininess.

Figure 6:
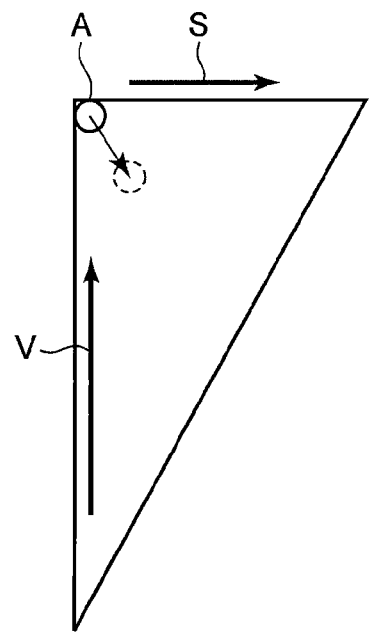
FIG. 6 is a partial sectional view of the HSV color space shown in FIG. 3.

In Step S9, the image processing unit 7 adjusts the saturation S and the brightness V of each pixel in the process area based on the intensity of the shine component. FIG. 6 is a partial sectional view of the HSV color space shown in FIG. 3. The pixel A, which is one of the pixels that are specified in Step S7 as constituting the process area, is located at a position where the saturation S is low and the brightness V is high as indicated in FIG. 6. Therefore, in Step S9, the color is adjusted so as to come closer to the flesh color by increasing the saturation S and decreasing the brightness V of all the pixels that constitute the process area based on the intensity of the shine component. Here, since only decreasing the brightness V results in a grey color, it is possible to make the color closer to the original flesh color by increasing the saturation S at the same time.

By adjusting the saturation and the brightness as described above, the pixel A in the process area shown in FIG. 6 is adjusted so as to move to a position indicated by the dashed line from a position indicated by the solid line in the figure. With this process, it is possible to reduce the shine component in the flesh color area, thereby making the color of the flesh color area in the image closer to the original flesh color.

In Step S10, the image processing unit 7 carries out color space conversion of the image data of the face area including the process area in which the shine component has been reduced from the HSV color space to the RGB color space.

Figure 4:
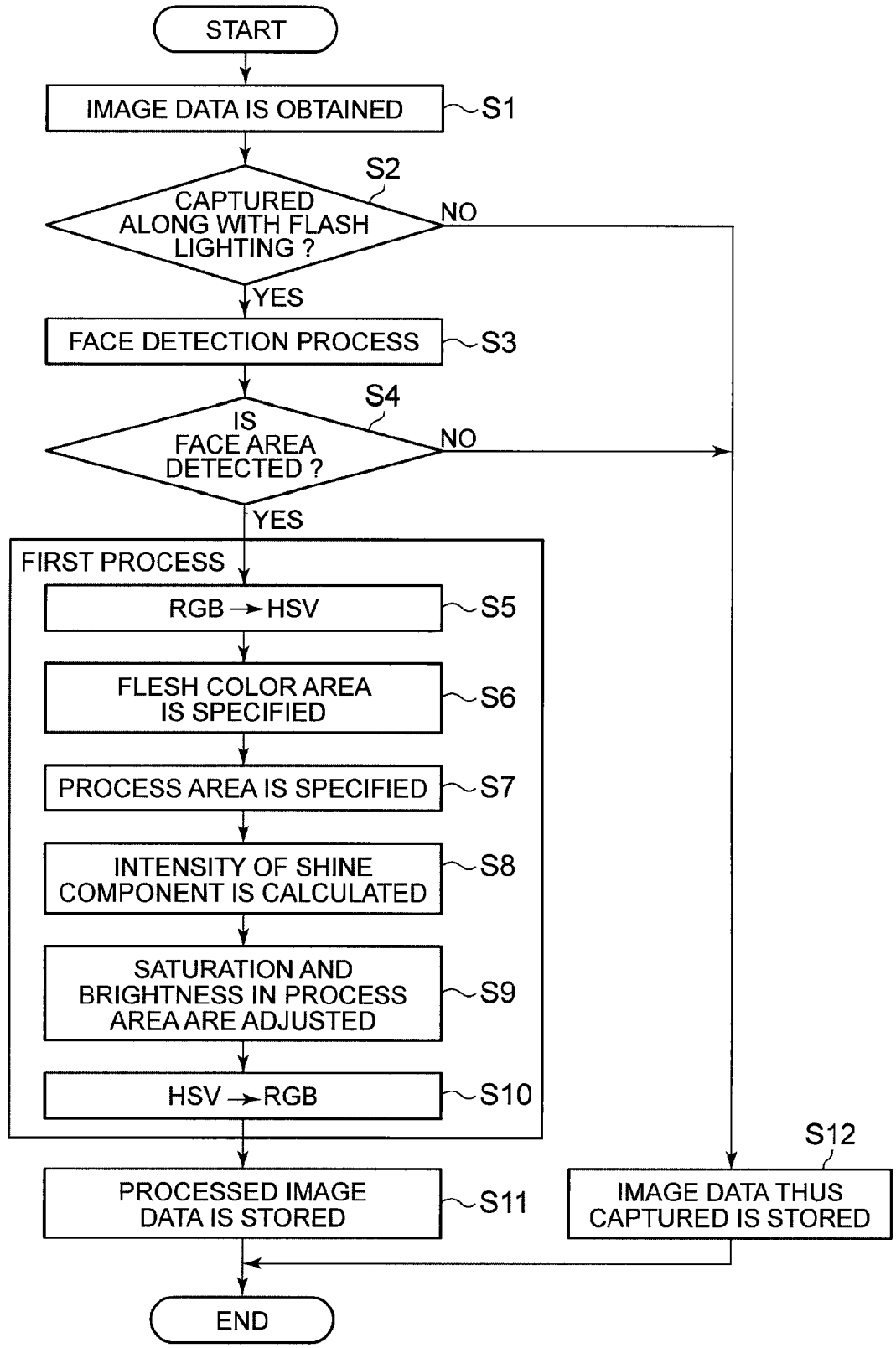
FIG. 4 is a flow chart showing a sequence of a shine suppressing process according to a first embodiment, the shine suppressing process suppressing shine by reducing shine components in image data that has been captured by the digital camera shown in FIG. 1.

As described above, through a series of processes from Steps S5 to S10 in the shine suppressing process shown in FIG. 4 according to the first embodiment, the process area is adjusted so that the saturation S increases and the brightness V decreases to reduce the shine component in the process area, thereby suppressing the shine as a result. Accordingly, the series of processes from Steps S5 to S10 is hereinafter referred to as a "first process".

When the "first process" ends in S10, the process proceeds to Step S11.

In Step S11, the image processing unit 7 stores the processed image data in the image storing unit 9.

Alternately, if the result of the determination in Step S2 or in Step S4 is NO, the process proceeds to Step S12. In Step S12, the image processing unit 7 stores (overwrites) the image data that has been captured in the image storing unit 9 in an unaltered state. After Step S11 or Step S12, the image processing unit 7 and the control unit 8 terminate the process of this flowchart.

The first embodiment of the digital camera 1 provides the following advantageous effects.

(1) The process area as the shine component in the person's face in the image data that has been captured is specified, and the saturation and the brightness of the process area are adjusted. Therefore, it is possible to reduce the shine component included in the image data and to convert a facial image area of the person into a more favorable image.

(2) With the function of face detection, the face area is detected from the image data, and the flesh color area is specified from the face area. Therefore, it is possible to increase the processing speed.

(3) In the flesh color area, pixels having saturation no greater than a predetermined value and having brightness no less than the predetermined value is specified as the process area that is the shine component. Therefore, it is possible to effectively determine the pixels of the shine component.

(4) The shine suppressing process for reducing the shine component is carried out only when the image data has been captured along with the flash lighting. Therefore, it is possible to carry out the shine suppressing process for reducing the shine component effectively on the image data that has been captured under a condition in which the shine component can be easily produced.

(5) The intensity of the saturation and the brightness in the process area is calculated, and the saturation and the brightness of each pixel in the process area are adjusted based on the calculated intensity of the saturation and the brightness. Therefore, it is possible to more accurately adjust the saturation and the brightness of each pixel in the process area.

[Second Embodiment]

A second embodiment is different from the first embodiment in that, in place of the first process, a second process is executed during the shine suppressing process on the photographic subject.

The digital camera 1 shown in FIG. 1 also functions as the second embodiment of the image processing apparatus. Accordingly, the description of the circuit configuration thereof is similar to the first embodiment, and thus not described herein. However, the processing information storing unit 5 of the second embodiment is not provided with the white component gain table storing unit 5a and the shine component gain table storing unit 5b, and stores various information used in the shine suppressing process of FIG. 7, which will be described later.

Next, the sequence of the shine suppressing process executed by the present embodiment of the digital camera 1 is described with reference to the flowchart shown in FIG. 7.

The following process is carried out by the control unit 8 shown in FIG. 1 controlling each unit. Furthermore, the process of this flowchart starts when the user instructs to start to store a captured image by operating the shutter key 11a after operating the capturing mode setting key 11b to set any of the capturing modes.

In Step S21, the image processing unit 7 obtains the image data processed by the preprocessing unit 4 from the image storing unit 9. Here, since it takes time to process if a pixel size is large, it is possible to create reduced scale image data by reducing the scale of the image data stored in the image storing unit 9, and to carry out the following process on this reduced scale image data.

In Step S22, the image processing unit 7 carries out the face detection process on the image data, thereby attempting to detect the face area in an image represented by the image data. Since the face detection process is a known technique, it will not be described in detail.

In Step S23, the image processing unit 7 determines whether or not the face area is detected in the image.

If the face area is not detected in the image, it is determined to be NO in Step S23, and the process proceeds to Step S33.

In Step S33, the image processing unit 7 stores (overwrites) the image data that has been captured in the image storing unit 9 in an unaltered state. With this, the process of this flowchart ends.

In contrast, if the face area is detected in the image, it is determined to be YES in Step S23, and the process proceeds to Step S24.

In Step S24, the image processing unit 7 obtains various information relating to the face included in the face area based on the result of the face detection process in Step S22 (hereinafter, the information is all referred to as the "face information").

More specifically, for example, information such as a coordinates of a frame enclosing the face area and coordinates of positions of eyes of the photographic subject included in the face area (hereinafter referred to as the "eye position information") is obtained as the face information.

In Step S25, the image processing unit 7 obtains information, which relates to a flesh color of the person who is the photographic subject, and is specified by the face information based on the face information obtained in the process of Step S24 (hereinafter referred to as "skin parameter").

More specifically, for example, the image processing unit 7 sets a predetermined area around the eyes based on the eye position information among the face information as a "flesh color obtaining area". The "flesh color obtaining area" is determined to be an area from which the skin parameter of the person who is the photographic subject can be obtained reliably.

The area that can be the flesh color obtaining area is an area where the skin of the person who is the photographic subject is certainly present, such as portions under the eyes, or a portion around the nose or the cheek, in general. Accordingly, in order to calculate the flesh color obtaining area, the eye position information is used here. However, in order to calculate the flesh color obtaining area, any information, not limited to the eye position information, can be used as long as the information is the face information with which the flesh color obtaining area can be calculated.

The image processing unit 7 carries out color space conversion of the image data of the flesh color obtaining area from the RGB color space to the HSV color space.

Then, the image processing unit 7 obtains information (a) to (c) listed below as the skin parameters from the image data of the flesh color obtaining area in the HSV color space.

It should be noted that, in the information (a) and (b) below, "the person" refers to the person whose face area has been detected, i.e., the person with a facial portion included in the flesh color obtaining area. Furthermore, "(HSV)" indicates that the information is constituted by values of the hue H, the saturation S, and the brightness V.

(a) Average parameters (HSV values) of the shiny area of the person (hereinafter abbreviated as the "first parameter").

(b) Average parameters (HSV values) of the skin area of the person without the shine (hereinafter abbreviated as the "second parameter").

(c) Ratio of the shiny area in the flesh color obtaining area.

Specifically, the image processing unit 7 distinguishes between the shiny area and the flesh color area excluding the shiny area in the flesh color obtaining area. Then, the image processing unit 7 calculates the average values of the hue H, the saturation S, and the brightness V of the pixels that constitute the shiny area as the first parameter. On the other hand, the image processing unit 7 calculates the average values of the hue H, the saturation S, and the brightness V of the pixels that constitute the flesh color area of the person without the shine as the second parameter. Furthermore, the image processing unit 7 calculates a ratio (%) of the shiny area in the flesh color obtaining area as the ratio of the shiny area in relation to the skin.

In Step S26, the image processing unit 7 calculates the target value based on the skin parameters obtained in the process of Step S25.

Here, the "target value" refers to a target value that is used to adjust (correct) so as to approximate the values of the hue H, the saturation S, and the brightness V in each pixel of the process area (hereinafter, these values are integrally referred to as the "HSV values") to the flesh color of the person who is the photographic subject. The target value is constituted by the HSV values.

For example, the target value is calculated according to the ratio of the shiny area based on a difference between the first parameter and the second parameter obtained in the process of Step S25.

The various information as described above, i.e., the face information obtained in the process of Step S24, the skin parameters (here, the first parameter, the second parameter, and the ratio of the shiny area to the skin) computed in the process of Step S25, and the target value calculated in the process of Step S26 are stored in the processing information storing unit 5.

Next, in Step S27, the image processing unit 7 carries out color space conversion of the image data of the face area obtained in the process of Step S24 from the RGB color space to the HSV color space.

In Step S28, the image processing unit 7 obtains the hue H from the image in the HSV color space, and specifies the flesh color area based on the hue H.

In Step S29, the image processing unit 7 specifies the process area in the flesh color area specified by the image processing unit 7 in Step S28.

The process area refers to an area that is specified as a shine component within the flesh color area, as described above in the description of Step S7 according to the first embodiment.

Therefore, although the process area can be specified by any method as long as the shine component can be specified, the same method as in the first embodiment is employed in the second embodiment. This means that an area of pixels where the saturation S is no greater than a predetermined value and the brightness V is no less than a predetermined value is specified as the process area.

In Step S30, the image processing unit 7 corrects the HSV values in the process area specified in the process of Step S29 based on the target value calculated in the process of Step S26.

With this, the shine component within the process area is reduced, and it is possible to approximate the color to the flesh color of the person included as the photographic subject in the captured image.

In Step S31, the image processing unit 7 carries out color space conversion of the image data of the face area including the process area in which the shine component has been reduced from the HSV color space to the RGB color space.

Figure 7:
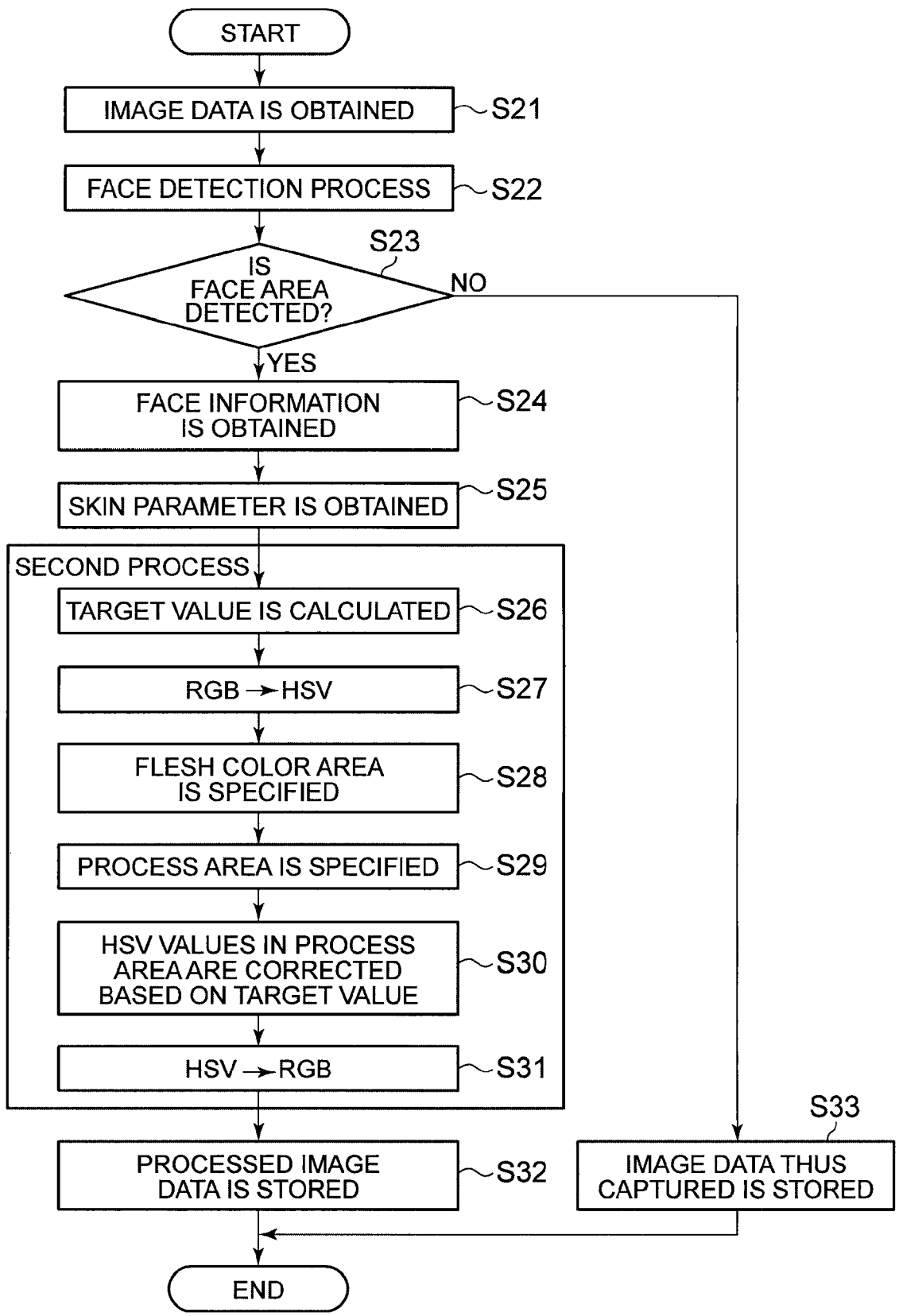
FIG. 7 is a flowchart showing a sequence of a shine suppressing process according to a second embodiment, the shine suppressing process suppressing shine by reducing shine components in image data that has been captured by the digital camera shown in FIG. 1.

As described above, through a series of processes from Steps S26 to S31 in the shine suppressing process of FIG. 7 according to the second embodiment, the flesh color of the person who is the photographic subject is taken into account, and each of the HSV values of the process area is adjusted to reduce the shine component in the process area. Thus, the series of processes from Steps S26 to S31 is hereinafter referred to as a "second process".

When the second process ends, the process proceeds to Step S32.

In Step S32, the image processing unit 7 stores the processed image data in the image storing unit 9. With this, the process of this flowchart ends.

Next, a specific example of the process of Step S26 of FIG. 7, i.e., a specific example of the process of calculating the target value is described with reference to FIGS. 8A and 8B and FIGS. 9A and 9B accordingly.

As described above, in the immediately previous Step S25, an area that can appropriately include the flesh color of the person who is the photographic subject out of the face area is calculated as the flesh color obtaining area. Then, the flesh color obtaining area is divided into the shiny area and the flesh color area, and the first parameter is calculated from the shiny area, and the second parameter is calculated from the flesh color area.

FIGS. 8A and 8B show the HSV space in which the pixels in the flesh color obtaining area are plotted. To be more specific, FIG. 8A shows a partial top view of the HSV space, and FIG. 8B shows a partial sectional view of the HSV space.

In FIG. 8A, x-marks respectively represent pixels that constitute the shiny area within the flesh color obtaining area. The average values of the hue H, the saturation S, and the brightness V for each of these pixels are calculated as a first parameter 51.

In FIG. 8A, blank circles (except the circles assigned with a numeric symbol 52) respectively represent the pixels that constitute the flesh color area within the flesh color obtaining area. The average values of the hue H, the saturation S, and the brightness V for each of these pixels are calculated as a second parameter 52.

As shown in FIG. 8A and FIG. 8B, a target value 53 is represented as a coordinate of a point on a line connecting the first parameter 51 and the second parameter 52 (the filled circles in the figures), i.e., as the values of the hue H, the saturation S, and the brightness V of this point.

The target value 53 can be computed as described below, for example.

First, the image processing unit 7 calculates differences between the HSV values of the second parameter 52 and the HSV values of the first parameter 51, respectively.

Next, if absolute values of the calculated differences are large, the image processing unit 7 is required to set the target value 53 close to the first parameter 51. In order to carry out the setting in this manner, it is necessary to provide markers indicating how much the target value 53 should be approximated to the first parameter 51. One of the markers that indicates a position of the point on the line connecting the first parameter 51 and the second parameter 52 in a percentage, with the first parameter 51 as a starting point (0%) and the second parameter 52 as an ending point (100%), is hereinafter referred to as a "correction ratio". Specifically, the correction ratio is a marker that indicates how much the target value 53 is approximated to the values of the first parameter 51, with a smaller percentage value indicating a value closer to the first parameter 51.

FIGS. 9A and 9B are exemplary partial top views of the HSV space, illustrating the correction ratio. To be more specific, FIG. 9A shows the target value 53 when the correction ratio is 15%. On the other hand, FIG. 9B shows the target value 53 when the correction ratio is 50%. Comparing FIG. 9A and FIG. 9B, it can be seen that the target value 53 when the correction ratio is 15% as in FIG. 9A is more approximated to the first parameter 51 than the target value 53 when the correction ratio is 50% as in FIG. 9B is.

Here, the image processing unit 7 sets the correction ratio based on various conditions, such as whether or not the image capturing is carried out along with the flash lighting of the light emitting unit 12, and the difference between the second parameter and the first parameter.

Then, the image processing unit 7 computes the target value 53 based on the first parameter, the second parameter, and the correction ratio that has been set.

As described above, a specific example of the process of Step S26 in FIG. 7, i.e., the specific example of the process of calculating the target value is described with reference to FIGS. 8A and 8B and FIGS. 9A and 9B accordingly.

Next, the HSV values of each pixel in the process area are corrected through the process of Step S30 in FIG. 7, so as to approximate to the target value.

According to the second embodiment of the digital camera 1, in addition to the same effect as provided in the first embodiment, the second process (see Steps S26 to S31 in FIG. 7) in which the flesh color of the person who is the photographic subject is taken into account is executed. Specifically, the color based on the flesh color of the person is set as the target value, and each pixel in the process area is appropriately corrected so as to be approximated to the target value. With this, it is possible to reduce the shine component based on the flesh color of the photographic subject; therefore, the shine in the photographic subject can be suppressed in a natural manner.

[Third Embodiment]

In a third embodiment of the shine suppressing process, the first process employed in the first embodiment (see Steps S5 to S10 in FIG. 4) and the second process employed in the second embodiment (see Steps S26 to S31 in FIG. 7) are selectively executed.

The digital camera 1 shown in FIG. 1 also functions as the third embodiment of the image processing apparatus. Accordingly, the explanation of circuit configuration is similar to the first embodiment, and thus not described here.

In the following, the sequence of the shine suppressing process executed by the third embodiment of the digital camera 1 is described with reference to a flowchart shown in FIG. 10.

The following process is carried out by the control unit 8 shown in FIG. 1 controlling each unit. Furthermore, the process of this flowchart starts when the user operates the capturing mode setting key 11b to set any of the capturing modes. Alternatively, the process starts when the shutter key 11a is pressed halfway.

In Step S41, the control unit 8 executes image capturing and live view display.

The control unit 8 sequentially reads the image data of each frame image temporarily stored in the processing information storing unit 5 or the like during the image capturing with live view, and sequentially displays a corresponding frame image in the display unit 10. The series of processes here is referred to as "live view display". The frame image displayed in the display unit 10 in such a live view display is hereinafter referred to as a "live view image".

It should be noted that the image capturing and the live view display can be naturally executed in the cases of the first embodiment and the second embodiment of the digital camera 1 as well. Specifically, the flowcharts shown in FIG. 4 and FIG. 7 illustrate the processes after the start of storing the image that has been captured is instructed by pressing (fully pressing) the shutter key 11a, as described above, and thus illustration of the steps of carrying out the image capturing and the live view display are simply omitted.

In Step S42, the image processing unit 7 carries out the face detection process on the image data of a live view image, thereby attempting to detect the face area in the live view image. Since the face detection process is a known technique, it will not be described in detail.

After a result of the face detection process is stored in the processing information storing unit 5, the process proceeds to Step S43.

In Step S43, the control unit 8 determines whether or not the shutter key 11a is pressed (fully pressed).

If the user has not fully pressed down the shutter key 11a, it is determined to be NO in Step S43, and the process returns to Step S41. Specifically, during a period until when the user fully presses the shutter key 11a, a looping process from Steps S41 to S43 is repeated, and the live view image is continuously displayed in the display unit 10 and the face detection process on the live view image is repeatedly executed during this period.

Subsequently, when the user fully presses the shutter key 11a, it is determined to be YES in Step S43, and the process proceeds to Step S45 since it is assumed that the storing of the image that has been captured being instructed. After this step, it is assumed that the image data of the frame image processed by the preprocessing unit 4 is stored in the image storing unit 9.

In Step S44, the image processing unit 7 obtains the image data of the frame image processed by the preprocessing unit 4 from the image storing unit 9. Here, as it takes time to process if a pixel size is large, it is possible to create the reduced scale image data by reducing the scale of the image data stored in the image storing unit 9, and to carry out the following process on this reduced scale image data.

In Step S45, the image processing unit 7 carries out the face detection process on the image data of the frame image obtained in the process of Step S44, thereby attempting to detect the face area in the frame image. Since the face detection process is a known technique, it will not be described in detail.

In Step S46, the image processing unit 7 determines whether or not the face area is detected in the frame image.

If the face area is not detected in the frame image, it is determined to be NO in Step S46, and the process proceeds to Step S54.

In Step S54, the image processing unit 7 stores (overwrites) the image data that has been captured in the image storing unit 9 in an unaltered state. With this, the process of this flowchart ends.

In contrast, if the face area is detected in the frame image, it is determined to be YES in Step S46, and the process proceeds to Step S47.

In Step S47, the image processing unit 7 obtains the face information based on the result of the face detection process in Step S45.

Specifically, for example, information such as the coordinates of the frame enclosing the face area and the eye position information of the photographic subject included in the face area are obtained as the face information.

In Step S48, the image processing unit 7 computes the skin parameters and the like based on the face information obtained in the process of Step S47.

More specifically, for example, the image processing unit 7 calculates, based on the eye position information, in the same manner as in the process of Step S25 in FIG. 7 according to the second embodiment, the area from which the skin information of the person who is the photographic subject can be accurately obtained out of the face area, as the flesh color obtaining area.

The image processing unit 7 carries out color space conversion of the image data of the flesh color obtaining area from the RGB color space to the HSV color space.

Then, the image processing unit 7 computes sets of information (a) to (e) listed below as the skin parameters and the like from the image data of the flesh color obtaining area in the HSV color space:

(a) first parameter;
(b) second parameter;
(c) ratio of the shiny area in the flesh color obtaining area;
(d) degree of reliability of the second parameter; and
(e) ratio of an area of the person's face image in relation to an area of entire image.

Since the sets of information (a) to (c) are computed in the same manner as in the process of Step S25 in FIG. 7 according to the second embodiment, a description thereof is not described here. Therefore, only the sets of information (d) and (e) not computed in the process of Step S25 in FIG. 7 according to the second embodiment are briefly described below.

Specifically, after calculating the second parameter, the image processing unit 7 calculates a degree of reliability of the second parameter in a percentage display. Although the method of calculation here is not particularly limited, a method of comparing average HSV values of the colors that are generally recognized as the flesh color with the HSV values of the second parameter of the person who is included as the photographic subject, for example, can be employed.

Furthermore, the image processing unit 7 computes, for example, a spatial ratio (in the percentage display) of the face area in the frame image (entire image) as the area of the person's face in relation to the entire image.

Moreover, in the third embodiment, the image processing unit 7 executes the following process as a part of the process of Step S48.

Specifically, in the immediately previous process of Step S47, the coordinates of the frame enclosing the face area are obtained as one of face information.

Therefore, the image processing unit 7 calculates an area excluding the frame enclosing the face area out of the frame image as a background area, based on the coordinates of the frame enclosing the face area.

The image processing unit 7 carries out color space conversion of image data of the background area from the RGB color space to the HSV color space.

Then, the image processing unit 7 computes sets of information (f) and (g) listed below as the skin parameters and the like from the image data of the background area in the HSV color space.

It should be noted that, in the sets of information (f) and (g) listed below, "background" refers to an image included in the background area. Furthermore, "(HSV)" represents that the information is constituted by the values of the hue H, the saturation S, and the brightness V;

(f) average parameters (HSV) of the shiny area of the background area (hereinafter abbreviated as the "third parameter"); and (g) ratio of a background shine to the flesh color of the background (hereinafter abbreviated as the "percentage (%) of the background shine").

Specifically, the image processing unit 7 distinguishes between the shiny area (a part having the same HSV property as the shine) and the flesh color area other than the shiny area in the background area. Then, the image processing unit 7 calculates the average values of the hue H, the saturation S, and the brightness V of the pixels that constitute the shiny area as the third parameter. Furthermore, the image processing unit 7 calculates a ratio (%) of the shiny area in the background area.

In Step S49, the image processing unit 7 selects one of a method of executing the "first process" (see Steps S5 to S10 in FIG. 4) and a method of executing the "second process" (see Steps S26 to S31 in FIG. 7), as a correcting process for suppressing the shine, based on the skin parameters and the like thus obtained in the process of Step S48.

Such a process of Step S49 is hereinafter referred to as "shine suppression method selecting process". The details of the shine suppression method selecting process will be described later with reference to FIG. 11.

In Step S50, the image processing unit 7 determines whether or not the method selected in the shine suppression method selecting process of Step S49 is the method of executing the second process. More specifically, the image processing unit 7 determines whether or not a person's skin color is to be considered. In a case in which it is determined that the person's skin color is to be considered, the method of executing the "second process" is selected, and in a case of not being so, the method of executing the "first process" is selected.

If the method of executing the "first process" has been selected in the shine suppression method selecting process of Step S49, it is determined to be NO in Step S50, and the process proceeds to Step S51.

In Step S51, the image processing unit 7 executes the "first process" (see Steps S5 to S10 in FIG. 4).

In contrast, if the method of executing the "second process" has been selected in the shine suppression method selecting process of Step S49, it is determined to be YES in Step S50, and the process proceeds to Step S52.

In Step S52, the image processing unit 7 executes the "second process" (see Steps S26 to S31 in FIG. 7).

In this manner, when either the "first process" of Step S51 or the "second process" of Step S52 is carried out on the image data obtained in the process of Step S44, the process proceeds to Step S53.

In Step S53, the image processing unit 7 stores the image data that has been processed in either Step S51 or S52 in the image storing unit 9. With this, the process of this flowchart ends.

Figure 10:
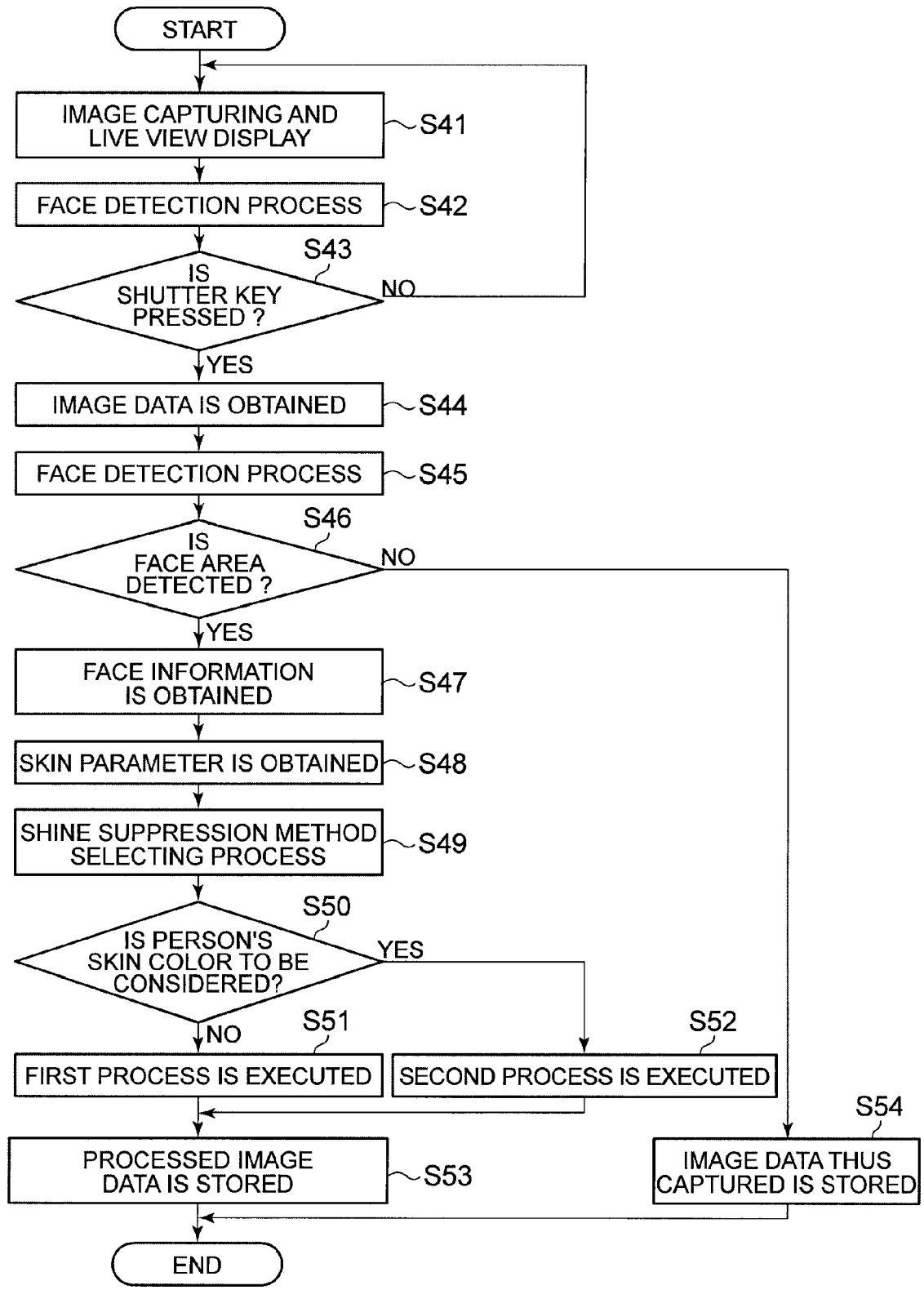
FIG. 10 is a flowchart showing a sequence of the shine suppressing process according to a third embodiment, the shine suppressing process suppressing shine by reducing the shine component in the image data that has been captured by the digital camera shown in FIG. 1.

Next, the detailed steps of the shine suppression method selecting process of Step S49 in FIG. 10 is described with reference to the flowchart shown in FIG. 11.

In Step S61, the image processing unit 7 determines the reliability of the number of faces detected in the face detection process of Step S45 in FIG. 10 (hereinafter simply referred to as the "reliability").

Although the method of determining the reliability is not particularly limited, the following method is employed in the present embodiment, for example.

Specifically, if the image data of the frame image obtained in the process of Step S44 in FIG. 10 is image data that has been captured along with the flash lighting of the light emitting unit 12, it is determined that the reliability is "1".

Furthermore, if the image data of the frame image obtained in the process of Step S44 is the image data that has been captured without the flash lighting of the light emitting unit 12, and if the number of faces that have been detected from the frame image in the face detection process of Step S45 and the number of faces that have been detected from the live view image in the face detection process of Step S42 are identical, it is determined that the reliability is "1".

On the other hand, if the image data of the frame image obtained in the process of Step S44 is image data that has been captured without the flash lighting of the light emitting unit 12, and if the number of faces that have been detected from the frame image in the face detection process of Step S45 and the number of faces that have been detected from the live view image in the face detection process of Step S42 are not identical, it is determined that the reliability is "0".

In Step S62, the image processing unit 7 sets a border value of the saturation S that weakens the effect of the shine suppressing process (hereinafter accordingly referred to as the "border value S").

In other words, in the third embodiment as well as in the first embodiment and the second embodiment, the border value S is previously set in the shine suppressing process. Such a value S is hereinafter referred to as the "initial border value". For example, a value of the saturation S at the border between a white area such as fluorescent lighting and the remaining area is generally set as the initial border value. Specifically, in the shine suppressing process using the initial border value, the degree of the effect of the shine suppressing process is reduced only in the white area such as fluorescent lighting.

However, a value of the saturation S of the first parameter in the flesh color obtaining area (hereinafter referred to as the "skin shine average S value") exceeds a value of the third parameter of the saturation S (hereinafter referred to as the "background shine average S value").

In this manner, in the state in which the skin shine average S value exceeds the background shine average S value, the shine suppressing process can be carried out only to the shiny area among the flesh color obtaining area.

Accordingly, in such a state, the image processing unit 7 sets a value between the skin shine average S value and the background shine average S value 112 as the border value S. With this, it is possible to reduce the degree of the effect of the shine suppressing process on the background area as well.

In Step S63, the image processing unit 7 determines whether or not the reliability determined in the process of Step S61 is "1".

If the reliability is "0", it is determined to be NO in Step S63, and the process proceeds to Step S69. In Step S69, the image processing unit 7 selects the method of executing the "first process" (see Steps S5 to S10 in FIG. 4) as the shine suppression method.

In contrast, if the reliability is "1", it is determined to be YES in Step S63 as not being appropriate to select the shine suppression method at this stage, and the process proceeds to Step S64.

In Step S64, the image processing unit 7 determines whether or not there is only one photographic subject.

If more than one person's face is detected in the image data of the frame image obtained in the process of Step S44 in FIG. 10 as a result of carrying out the face detection process of Step S45, i.e., if there is more than one photographic subject, it is determined to be NO in Step S64, and the process proceeds to Step S69. In Step S69, the image processing unit 7 selects the method of executing the "first process" as the shine suppression method.

In contrast, if a single person's face is detected in the image data of the frame image obtained the process of Step S44 in FIG. 10 as a result of carrying out the face detection process of Step S45, i.e., if there is one photographic subject, it is determined to be YES in Step S64 as not being appropriate to select the shine suppression method at this stage, and the process proceeds to Step S65.

It should be noted that the "second process" in the third embodiment is provided with the process of Step S64, since it is presupposed that the flesh color of a single person who is the photographic subject is taken into account. Therefore, in a case in which the "second process" that can take flesh colors of individual persons of more than one photographic subject into account is employed, the process of Step S64 can be omitted.

In Step S65, the image processing unit 7 determines whether or not the degree of reliability of the second parameter (the sets of information (d) obtained in the process of Step S48 in FIG. 10) is no greater than a predetermined level.

If the degree of reliability of the second parameter is no greater than the predetermined level, it is determined to be YES in Step S65, and the process proceeds to Step S69. In Step S69, the image processing unit 7 selects the method of executing the "first process" as the shine suppression method.

In contrast, if the degree of reliability of the second parameter is greater than the predetermined level, it is determined to be NO in Step S65 as not being appropriate to select the shine suppression method at this stage, and the process proceeds to Step S66.

In Step S66, the image processing unit 7 determines whether or not the ratio of the area of the person's face in relation to the area of the entire image (the sets of information (e) obtained in the process of Step S48 in FIG. 10) is no less than a predetermined level.

If the area of the person's face is no less than the predetermined level, it is determined to be YES in Step S66, and the process proceeds to Step S70. In Step S70, the image processing unit 7 selects the method of executing the "second process" (see Steps S26 to S31 in FIG. 7) as the shine suppression method.

In contrast, if the area of the person's face is smaller than the predetermined level, it is determined to be NO in Step S66 as not being appropriate to select the shine suppression method at this stage, and the process proceeds to Step S67.

In Step S67, the image processing unit 7 determines whether or not the value of the saturation S of the second parameter (the sets of information (b) obtained in the process of Step S48 in FIG. 10, and hereinafter referred to as "S value of the second parameter") is within a predetermined range.

If the S value of the second parameter is within the predetermined range, it is determined to be YES in Step S67, and the process proceeds to Step S70. In Step S70, the image processing unit 7 selects the method of executing the "second process" as the shine suppression method.

In contrast, if the S value of the second parameter does not fall within the predetermined range, it is determined to be NO in Step S67 as not being appropriate to select the shine suppression method at this stage, and the process proceeds to Step S68.

In Step S68, the image processing unit 7 determines whether or not the ratio of the shiny area in the background area (the set of information (g) obtained in the process of Step S48 in FIG. 10) is no greater than a predetermined level.

If the percentage (%) of the background shine is no greater than the predetermined level, it is determined to be YES in Step S68, and the process proceeds to Step S70. In Step S70, the image processing unit 7 selects the method of executing the "second process" as the shine suppression method.

In contrast, if the percentage (%) of the background shine is greater than the predetermined level, it is determined to be NO in Step S68, and the process proceeds to Step S69. In Step S69, the image processing unit 7 selects the method of executing the "first process" as the shine suppression method.

As described above, when the shine suppression method is selected in the process of Steps S69 or S70, the shine suppression method selecting process ends.

Specifically, the process of Step S49 in FIG. 10 ends, and the process proceeds to Step S50.

Figure 11:
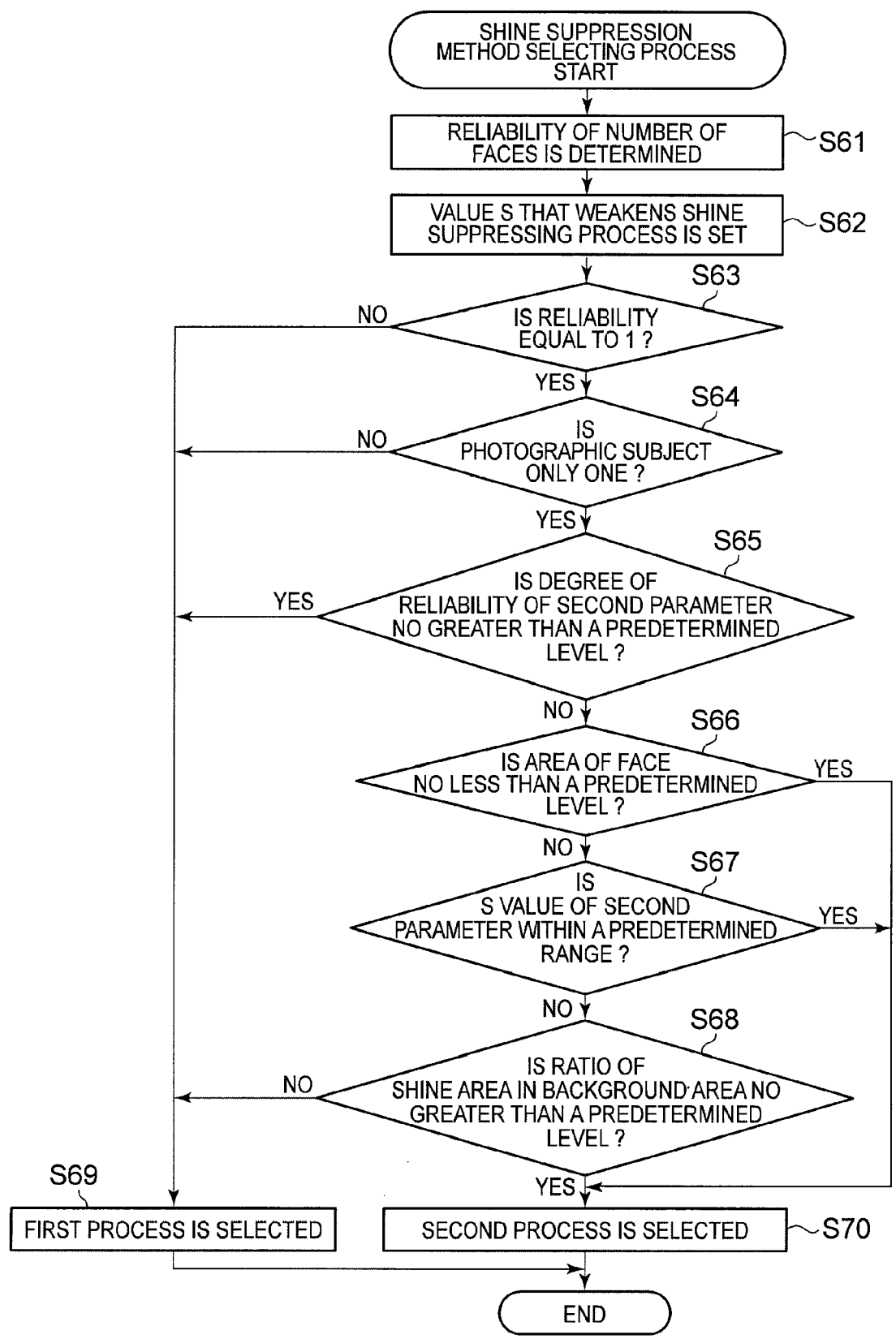
FIG. 11 is a flowchart showing detailed sequence of a shine suppression method selecting process of the shine suppressing process according to the third embodiment shown in FIG. 10.

If the method of executing the "first process" has been selected in the process of Step S69 in FIG. 11, it is determined to be NO in Step S50, and the "first process" is executed in the process of Step S51.

In contrast, if the method of executing the "second process" has been selected in the process of Step S70 in FIG. 11, it is determined to be YES in Step S50, and the "second process" is executed in the process of Step S52.

The digital camera 1 of the third embodiment provides the following effect (9) in addition to the effects (1) to (5) similarly to the first embodiment and the effects (6) to (8) similarly to the second embodiment.

(9) By executing the "second process" (see Steps S26 to S31 in FIG. 7) according to the second embodiment, the effect (6) described above can be provided. Specifically, the "first process" (see Steps S5 to S10 in FIG. 4) according to the first embodiment poses a problem in that the color is tinged with red. The effect (6) described above solves this problem.

However, there is often a case in which executing the "second process" not only fails to address to this problem, but leads to an undesirable process result, such as the case in which the information relating to the skin of the person who is the photographic subject is not appropriately obtained. Alternatively, it is probable that the "second process" cannot be executed at all as the necessary information is not provided.

According to the third embodiment, it is possible to execute the "first process" in place of the "second process" even in such a case, and thus the effect of the shine suppression above a certain level can be realized.

Although the first embodiment, the second embodiment, and the third embodiment according to the present invention have been described, the present invention is not limited to the above described embodiments. Specifically, it should be appreciated that variations and improvements within a scope that can achieve the object of the present invention as described below are included in the present invention.

(1) When the person capturing mode is set, the control unit 8 may carry out the shine suppressing process for reducing the shine component in the image data that has been captured. In the person capturing mode, it is highly probable that the flash lighting automatically emits light while the person's face is captured. Thus, the shine component is likely produced in the person's face that has been captured. Accordingly, when the person capturing mode is set, the shine suppressing process for reducing the shine component can be carried out on the image data that has been captured regardless of the use of the flash light emission. With this, it is possible to obtain a more favorable image in which the shine component is reduced.

(2) It is also possible to extract a portion corresponding to the person's forehead, cheek, or nose, where the occurrence of the shine component is easily, in the face area that has been detected in the face detection process, and to specify the process area from these portions. With this, the portion where the shine component can be easily produced is extracted, and thus it is possible to more accurately specify the process area.

(3) The flesh color area and the process area can be specified by the user, while looking at an image displayed in the display unit 10, using an operation input member that is not shown in the drawing. In this case, it is possible for the user to visually determine the distribution of the hue H in the flesh color area by displaying the schematic diagram of the HSV color space shown in FIG. 2 in color on the display unit 10.

(4) All or a part of the functions of the image processing unit 7 as described above can be realized by the control unit 8 operating according to the image processing programs relating to the present invention.

(5) According to the embodiment described above, the example in which the photographing lens 2 and the image capturing unit 3 serve as the image obtaining means in the present invention. However, it is possible to employ a configuration such that an image that has been captured using another digital camera or the like is imported into the digital camera 1. In this case, a card slot unit to which a storing medium in which the image data is stored is detachably loaded or a connecting terminal to a cable or a transmitter for importing the image data through a wire or wirelessly serves as the image obtaining means.

(6) Furthermore, according to the embodiment described above, the process area is detected from the flesh color area. However, the process area can be detected from a different color area. In this case, a range of a desired value of the hue H is first specified, and an area of pixels within the range of the specified value of the hue H and having a saturation S that is no greater than the predetermined value and a brightness V that is no smaller than the predetermined value is specified as the process area.

(7) In the second embodiment, the image processing unit 7 sets the target value based on the first parameter and the second parameter of the flesh color obtaining area. However, the target value can be set taking only the second parameter into account.

(8) Moreover, the present invention is not particularly limited to the HSV space, and can be widely applied to various hue spaces such as a YUV space or an RGB space.

(9) The present invention is not limited to digital cameras, and can be applied to electronic devices in general having a function for capturing still images, for example, such as a mobile phone provided with a camera. Furthermore, the present invention can be applied to any image processing apparatus having a function of color image processing. The image processing apparatus according to the present invention also include a computer apparatus capable of realizing functions of the image processing unit 7 according to any embodiments by operating according to a predetermined program.

What is claimed is:

1. An image processing apparatus comprising:
a CPU;
an image obtaining unit that obtains an image;
a color area detecting unit that detects a predetermined color area from the image; an area specifying unit that specifies an area to be adjusted based on a saturation and a brightness of the color area;
a color adjusting unit that adjusts at least one of a hue, the saturation, and the brightness of the area to be adjusted; and
a face detecting unit that detects a face area of a person from the image;
wherein:
the color area detecting unit detects a predetermined color area from an image of the face area;
the color adjusting unit includes a flesh color information obtaining unit that obtains flesh color information relating to a flesh color of the person based on the image of the face area;
the flesh color information obtaining unit obtains first average value information and second average value information as the flesh color information, the first average value information containing average values of the hue, the saturation, and the brightness, respectively, of pixels in the area to be adjusted, and the second average value information containing average values of the hue, the saturation, and the brightness, respectively, of pixels in a flesh color obtaining area from which the flesh color information is to be obtained out of the image of the face area;

the color adjusting unit adjusts at least one of the hue, the saturation, and the brightness of the pixels in the area to be adjusted based on a difference between the first average value information and the second average value information obtained by the flesh color information obtaining unit; and functions of the image obtaining unit, the color area detecting unit, the area specifying unit, the color adjusting unit, and the face detecting unit are performed under control of the CPU.

2. The image processing apparatus as set forth in claim 1, wherein the color adjusting unit obtains the difference between the first average value information and the second average value information for each of the hue, the saturation, and the brightness, and obtains at least one of the hue, the saturation, and the brightness of the pixels in the area to be adjusted based on the difference.

3. An image processing apparatus, comprising:
a CPU;
an image obtaining unit that obtains an image;
a face detecting unit that detects a face area of a person from the image obtained by the image obtaining unit;
a color area detecting unit that obtains a hue from an image of the face area, and detects a predetermined color area based on the hue;
an area specifying unit that specifies an area to be adjusted from the predetermined color area, based on a saturation and a brightness of the predetermined color area; and
a color adjusting unit that adjusts at least one of the hue, the saturation, and the brightness of a pixel in the area to be adjusted;
wherein:
the color adjusting unit includes a flesh color information obtaining unit that obtains flesh color information relating to a flesh color of a person included in the image, and adjusts each of the hue, the saturation, and the brightness of the pixel in the area to be adjusted based on the flesh color information obtained by the flesh color information obtaining unit,
the flesh color information obtaining unit includes:
a position information obtaining unit that obtains position information indicating a position of a specific portion of the person included in the face area; and
a setting unit that sets an area from which the flesh color information of the person is to be obtained out of the face area as a flesh color obtaining area based on the position information;
the flesh color information obtaining unit obtains the flesh color information based on an image of the flesh color obtaining area,
the flesh color information obtaining unit obtains first average value information and second average value information as the flesh color information, the first average value information containing average values of the hue, the saturation, and the brightness, respectively, of pixels in the area to be adjusted, and the second average value information containing average values of the hue, the saturation, and the brightness, respectively, of pixels in the flesh color obtaining area, the color adjusting unit adjusts at least one of the hue, the saturation, and the brightness of the pixels in the area to be adjusted based on a difference between the first average value information and the second average value information obtained by the flesh color information obtaining unit; and functions of the image obtaining unit, the color area detecting unit, the area specifying unit, the color adjusting unit, and the face detecting unit are performed under control of the CPU.

4. The image processing apparatus as set forth in claim 3, wherein the color adjusting unit obtains the difference between the first average value information and the second average value information for each of the hue, the saturation, and the brightness, and obtains at least one of the hue, the saturation, and the brightness of the pixels in the area to be adjusted based on the difference.

5. An image processing apparatus, comprising:
a CPU;
an image obtaining unit that obtains an image;
a face detecting unit that detects a face area of a person from the image obtained by the image obtaining unit;
a color area detecting unit that obtains a hue from an image of the face area, and detects a predetermined color area based on the hue;
an area specifying unit that specifies an area to be adjusted from the predetermined color area, based on a saturation and a brightness of the predetermined color area; and
a color adjusting unit that adjusts at least one of the hue, the saturation, and the brightness of a pixel in the area to be adjusted;
wherein:
the color adjusting unit includes a flesh color information obtaining unit that obtains flesh color information relating to a flesh color of a person included in the image, and adjusts each of the hue, the saturation, and the brightness of the pixel in the area to be adjusted based on the flesh color information obtained by the flesh color information obtaining unit;
the flesh color information obtaining unit obtains first average value information and second average value information as the flesh color information, the first average value information containing average values of the hue, the saturation, and the brightness, respectively, of pixels in the area to be adjusted, and the second average value information containing average values of the hue, the saturation, and the brightness, respectively, of pixels in a flesh color obtaining area from which the flesh color information is to be obtained out of the image of the face area;

the color adjusting unit adjusts at least one of the hue, the saturation, and the brightness of the pixels in the area to be adjusted based on a difference between the first average value information and the second average value information obtained by the flesh color information obtaining unit; and functions of the image obtaining unit, the color area detecting unit, the area specifying unit, the color adjusting unit, and the face detecting unit are performed under control of the CPU.

6. An image processing apparatus as set forth in claim 5, wherein the color adjusting unit obtains the difference between the first average value information and the second average value information for each of the hue, the saturation, and the brightness, and obtains at least one of the hue, the saturation, and the brightness of the pixels of the area to be adjusted based on the difference.

7. An image processing method comprising:
  obtaining an image;
  detecting a face area of a person from the image, and detecting a predetermined color area from an image of the face area;
  specifying an area to be adjusted based on a saturation and a brightness of the color area;
  obtaining flesh color information relating to a flesh color of the person based on the image of the face area; and
  adjusting at least one of a hue, the saturation, and the brightness of the area to be adjusted;
  wherein the obtaining comprises obtaining first average value information and second average value information as the flesh color information, the first average value information containing average values of the hue, the saturation, and the brightness, respectively, of pixels in the area to be adjusted, and the second average value information containing average values of the hue, the saturation, and the brightness, respectively, of pixels in a flesh color obtaining area from which the flesh color information is to be obtained out of the image of the face area; and
  the adjusting comprises adjusting at least one of the hue, the saturation, and the brightness of the pixels in the area to be adjusted based on a difference between the obtained first average value information and the obtained second average value information.

8. A non-transitory computer readable storage medium having an image processing program stored thereon which controls a computer provided with an image obtaining unit that obtains an image, the program controlling the computer to perform functions comprising:
  detecting a face area of a person from the image, and detecting a predetermined color area from an image of the face area;
  specifying an area to be adjusted based on a saturation and a brightness of the color area;
  obtaining flesh color information relating to a flesh color of the person based on the image of the face area; and
  adjusting at least one of a hue, the saturation, and the brightness of the area to be adjusted;
  wherein:
  the obtaining comprises obtaining first average value information and second average value information as the flesh color information, the first average value information containing average values of the hue, the saturation, and the brightness, respectively, of pixels in the area to be adjusted, and the second average value information containing average values of the hue, the saturation, and the brightness, respectively, of pixels in a flesh color obtaining area from which the flesh color information is to be obtained out of the image of the face area; and
  the adjusting comprises adjusting at least one of the hue, the saturation, and the brightness of the pixels in the area to be adjusted based on a difference between the obtained first average value information and the obtained second average value.

* * * * *